United States Patent
Duclaud et al.

(10) Patent No.: US 6,176,917 B1
(45) Date of Patent: Jan. 23, 2001

(54) BORON-CONTAINING AQUEOUS SOLUTION PARTICULARLY FOR ADDITION TO AMYLOID GLUE

(75) Inventors: Didier Marcel Duclaud, Mirabel et Blacons; René De Pannemacker, Hostun; Jean-Christophe Lago, Crest, all of (FR)

(73) Assignee: Development, Activities Chimiques Distribution, Saint-Marcel-les-Valence (FR)

( * ) Notice: Under 35 U.S.C. 154(b), the term of this patent shall be extended for 0 days.

(21) Appl. No.: 08/894,369

(22) PCT Filed: Feb. 23, 1996

(86) PCT No.: PCT/FR96/00292

§ 371 Date: Feb. 26, 1998

§ 102(e) Date: Feb. 26, 1998

(87) PCT Pub. No.: WO96/26252

PCT Pub. Date: Aug. 29, 1996

(Under 37 CFR 1.47)

(30) Foreign Application Priority Data

Feb. 24, 1995 (FR) .................................................. 95 02391

(51) Int. Cl.[7] .......................... B01F 3/12; C09D 103/02; C09J 103/02
(52) U.S. Cl. .................... 106/211.1; 252/363.5; 516/77; 516/105
(58) Field of Search ................. 516/77, 105; 252/363.5; 106/211.1; 558/293, 295

(56) References Cited

U.S. PATENT DOCUMENTS

| | | | |
|---|---|---|---|
| 2,408,332 | * 9/1946 | Morgan | 558/295 X |
| 2,657,137 | * 10/1953 | Kessels | 252/363.5 X |
| 2,994,615 | * 8/1961 | McDonald | 106/211.1 X |
| 3,066,037 | * 11/1962 | Curtin et al. | 106/211.1 X |
| 3,228,781 | * 1/1966 | Halpert . | |
| 4,332,609 | * 6/1982 | Ott . | |
| 5,026,735 | * 6/1991 | Stern | 516/105 X |

FOREIGN PATENT DOCUMENTS

| | | | |
|---|---|---|---|
| 842649 | * 12/1976 | (BE) . | |
| 2401554 | * 7/1975 | (DE) . | |
| 0326247 | * 8/1989 | (EP) . | |
| 2313391 | * 12/1976 | (FR) | 558/295 |

* cited by examiner

Primary Examiner—Richard D. Lovering
(74) Attorney, Agent, or Firm—Bacon & Thomas

(57) ABSTRACT

The present invention relates to a boron-containing aqueous solution comprising at least one amino compound and/or one organic polyhydroxylated compound, characterized in that:

it comprises a theoretical amount of $B_2O_3$ of between 25 and 55% by weight, at least one solubilized complex between at least one boron-containing product and the amino compound and/or one organic polyhydroxylated compound, and optionally at least one biocide and/or one antifoam and/or one anionic or non-ionic surfactant, it is obtained from at least one initial boron-containing solute consisting of a mixture of at least one borate, boric acid and/or $B_2O_3$ and optionally at least one strong base, and its pH is between 6 and 9.

Application: Addition to starch paste, brightening products or biocides and for the decontamination of radioactive materials, inter alia.

24 Claims, No Drawings

BORON-CONTAINING AQUEOUS SOLUTION PARTICULARLY FOR ADDITION TO AMYLOID GLUE

This application is a 371 of PCT/FR96/00292 filed Feb. 23, 1996.

TECHNICAL FIELD

The technical field of the present invention is that of the solubilization of boron-containing compounds, especially, but without implying a limitation, for the purpose of adding boron-containing compositions to starch pastes.

More precisely, the invention relates to the incorporation of boric acid and/or borates, such as borax, into aqueous compositions, for example the starch compositions of the type employed for the manufacture of starch pastes. The latter are useful especially in the paper/cardboard industry and more particularly for the manufacture of cardboard and cardboard packagings.

Even more precisely, the invention relates to a boron-containing aqueous solution and to its use e.g. for addition to starch pastes, said solution being of the type containing at least one amino compound, preferably an aminohydroxylated compound or an alkylamine, and/or one polyhydroxylated compound.

PRIOR ART

Boron-containing or boracic products are derivatives of the chemical element boron (B) and reference will be made to this meaning in the present disclosure. Thus, in terms of the present invention, these derivatives are especially boric acid and borates, for example borax pentahydrate, borax decahydrate, sodium pentaborate tetrahydrate, sodium metaborate octahydrate, potassium tetraborate tetrahydrate and potassium pentaborate octahydrate. These commercial boron-containing products are widely used as more or less active ingredients in all kinds of compositions such as fertilizers, detergents, metallurgical cutting oils, drugs, cosmetics or starch-based products like paper/cardboard adhesives.

If starch pastes are taken as an example, it is necessary to know that they contain native starch and/or modified starch such as crosslinked starches. To be able to develop their power as a vehicle, said starches have to be heated in the presence of sodium hydroxide so as to cause all the starch grains to burst. This forms a paste to which the secondary starch is added. The latter defines the adhesive power of the paste since the combination of the temperature generated by the fluted rollers and the application of the paste to the cardboard makes it possible to form a complex bonded by the fact that the secondary starch has burst. One of the difficulties encountered by the applicators during the formation of the paste concerns viscosity control. The viscosity must be carefully fixed so as to allow easy coating onto the substrates to be glued. Thus it is known to use boron-containing adjuvants for this purpose, said adjuvants having plasticizing, reinforcing, thickening and adhesion promoting effects (inter alia) on starch paste.

Conventionally the boron-containing product added consists of borax powder, which is incorporated continuously or semicontinuously into the starch paste during its formation. This pulverulent boron-containing form is the cause of several disadvantages. Firstly, borax powder presents storage problems because it tends to absorb water, resulting in caking phenomena. Now, it is clear that a caked product is difficult to handle, especially because it does not flow. Secondly, borax powder (whether caked or not) is liable to cause dosage inaccuracies because of the blocking or jamming incidents which can occur in the powder feed systems (hopper, feed screw) conventionally employed in continuous paste manufacturing processes. Thirdly, borax powder mixes poorly with the starch paste during its formation; this necessitates sophisticated stirring means and longer reaction or incorporation times.

In an attempt to surmount these difficulties, it has been proposed to add the boric acid or the hydrated borax in the form of a solution since obviously the handling of a liquid and the intimate mixing of a liquid with a liquid are simpler than the handling of a solid.

Thus European patent application No. 326 247 describes a process for the addition of boric acid or borate to a starch paste during its preparation. The boron-containing liquid composition used in the invention according to said patent application of the prior art comprises 25 to 35% by weight of boric acid or borate, 55 to 35% by weight of water and 20 to 30% by weight of monoethanolamine or a polyhydroxylated organic compound. Such compositions are relatively poor in boron-containing active principle. Consequently the corresponding theoretical concentrations of boron trioxide, $B_2O_3$, are even lower. These are not optimal conditions for the efficacy of the boron-containing product as a starch paste adjuvant. Moreover, it demonstrates a certain inability of the invention according to said patent application EP no. 326 247 to improve the solubility of boron-containing products in water, said solubility being known to be very low. Furthermore, in this process of the prior art, care is taken to prepare the boron-containing liquid composition at dissolution temperatures below 70° C. The intention here is to avoid the formation of a soluble complex between the boron-containing product and the ingredients of the monoethanolamine type or polyhydroxylic compound type. This technical provision conceals the fear of an organic perturbation or even a lowering of the efficacy of the boron-containing product in the event that it should form a complex. Finally, this known boron-containing liquid composition has poor performance characteristics and consequently a low economic viability.

American U.S. Pat. No. 4,332,609 describes a boron-containing fertilizer comprising a compound of boric acid with an alkanolamine. Said document has no bearing inter alia on the use of boron-containing liquid as a starch paste adjuvant.

It therefore has to be concluded that the prior art is imperfect, or even has failed, as regards the provision of a liquid boron-containing substitute for traditional borax powder, especially in the context of addition to various compositions, for example starch pastes, decontaminating compositions for radioactive products, biocidal compositions or brightening and waxing compositions, inter alia.

This being so, one of the essential objectives of the invention is to provide a boron-containing adjuvant, especially for starch paste, which is in the form of a stable liquid and which has a high efficacy per unit mass, especially when functioning as an adhesion promoter, plasticizer and cohesion strengthener for starch adhesive.

Another objective of the invention is to provide a boron-containing liquid adjuvant, especially for starch pastes, decontaminating compositions for radioactive products, biocidal compositions or brightening and waxing compositions, which is easy to prepare and handle.

Another essential objective of the invention is to provide a boron-containing liquid adjuvant, especially for starch pastes, decontaminating compositions for radioactive products, biocidal compositions or brightening and waxing compositions, which is economic by virtue of using a single product for several actions.

Another essential objective of the invention is to provide a substitute boron-containing liquid adjuvant, especially for starch pastes, decontaminating compositions for radioactive products, biocidal compositions or brightening and waxing compositions, said adjuvant being in the form of a solution.

Another essential objective of the invention is to provide a boron-containing liquid adjuvant, especially for starch pastes, decontaminating compositions for radioactive products, biocidal compositions or brightening and waxing compositions, which possesses at least one of the following properties: bactericidal, fungicidal and antifoaming (inter alia).

Another objective of the invention is to provide a simple and inexpensive process for the preparation of the above-mentioned adjuvant.

BRIEF DESCRIPTION OF THE INVENTION

These and other objectives are achieved by the present invention, which relates first and foremost to a boron-containing aqueous solution, especially for addition to starch paste, said solution containing at least one amino compound (alkylamino and/or aminohydroxylated and/or arylamino compound) and/or one organic polyhydroxylated compound. This solution is characterized in that:
  it comprises:
    a theoretical amount of $B_2O_3$ of between 22 and 55, preferably of between 25 and 45 and particularly preferably of between 32 and 38% by weight,
    at least one solubilized complex between at least one boron-containing product and the amino compound, preferably aminohydroxylated and/or alkylamino and/or arylamine compound, and/or one organic polyhydroxylated compound,
    and optionally at least one biocide and/or one antifoam and/or one anionic or non-ionic surfactant,
  it is obtained from at least one initial boron-containing solute consisting of a mixture of:
    at least one borate,
    boric acid and/or $B_2O_3$,
    and optionally at least one strong base,
  and its pH is between 6 and 9, preferably between 7 and 8.

This solution can advantageously comprise at least one agent for increasing the wettability of the solution, said agent preferably being selected from the following compounds: methanol or 2-etbylhexyl sulfate and mixtures thereof The present invention further relates to the use of a boron-containing aqueous solution, especially as defined above, for addition to starch paste, said solution containing at least one amino compound, preferably aminohydroxylated and/or alkylamino compound, and/or one organic polyhydroxylated compound,
  characterized in that:
    it comprises an initial theoretical amount of $B_2O_3$ of between 25 and 55, preferably of between 25 and 45 and particularly preferably of between 32 and 38% by weight,
    and at least one solubilized complex between at least one boron-containing product and the amino compound, preferably aminohydroxylated and/or alkylamino compound, and/or one organic polyhydroxylated compound,
    and its pH is between 6 and 9, preferably between 7 and 8.

DETAILED DISCLOSURE OF THE INVENTION

It is to the Applicant's credit to have demonstrated the importance of the theoretical amount of boron trioxide, $B_2O_3$, in the boron-containing liquid composition in question. It has thus been possible to demonstrate that it is important not to drop below a minimum theoretical concentration of $B_2O_3$ in order to achieve an optimum in terms of the compromise between efficacy and water solubility for the boron-containing product, and moreover that the presence of a solubilized complex of boron-containing product/ amino compound and/or organic polyhydroxylated compound is also essential. The choice of pH range is also important. It determines a good solubilization of the constituents of the boron-containing liquid composition.

Surprisingly, and without wishing to be tied down by theory, the Applicant has shown that the solubilization of the boron-containing product or (solute) proceeds on the one hand via its conversion to a complex with an aminohydroxylated compound and/or with an aminoalkylated compound and/or with an organic polyhydroxylated compound, and on the other hand via its conversion to a very water-soluble borate, e.g. sodium pentaborate.

Knowing the complexation equation and the solubility of this particularly soluble borate, being 15.2% by weight in the case of sodium pentaborate, those skilled in the art can determine from the starting solutes the appropriate stoichiometric amounts for achieving complexation and, if required, an optimal conversion to soluble borate.

In one modified embodiment, the boron-containing aqueous solution can be devoid of amino products and/or polyhydroxylated compounds and can contain one or more additives of the following types: biocide (fungicide/ bactericide), antifoam, surfactant, etc.

The use of a liquid boron-containing adjuvant consisting of an aqueous solution according to the invention is perfectly compatible with a continuous or semicontinuous mode of preparation of, for example, starch paste. Conventionally such a preparation immediately precedes the coating of the starch adhesive onto the substrates to be glued (paper, cardboard). The solution according to the invention is incorporated easily and, once introduced, said solution mixes intimately with the starch paste containing added sodium hydroxide. This step is short, so the starch paste rapidly acquires the properties which the boron-containing solution confers, namely adhesiveness, appropriate viscosity (thick texture), strengthening of cohesion.

It should be observed that the solution according to the invention constitutes a weight-for-weight substitute for borax powder.

It is also important to emphasize that the boron-containing aqueous solution according to the invention is stable on storage (several months at temperatures ranging from −5° C. to above 60° C.) and ideally does not contain any undissolved, crystalline products.

Apart from shortening the time required for homogenization with the components of the starch paste during its formation, the boron-containing aqueous solution according to the invention increases the bursting temperature of the starch paste (gelatinization temperature). This clearly opens up the possibility of using starch which originally has a low bursting temperature.

The incorporation of the solution according to the invention is accompanied by stirring.

It is self-evident that the invention is not limited to the starch paste application mentioned above.

In a preferred provision of the invention, the aminohydroxylated compound is selected from the following products: monoethanolamine, diethanolamine, triethanolamine and mixtures thereof (inter alia), the amino compound is selected from the following products: hydrazine, diethylenetriamine, ethylenediamine and, inter alia, mixtures thereof, and the organic polyhydroxylated compound is selected from the following products: glycerol, glucose, sorbitol, inter alia, and mixtures thereof.

The aminohydroxylated compound may have a lowering effect on the pH of the solution, which has to be allowed for when regulating the pH.

It might be useful in certain cases to employ at least one strong mineral or organic base to adjust the pH to between 7 and 8 in the boron-containing aqueous solution in question. This base is preferably of a hydroxylic nature, but particularly preferably is selected from the following products: NaOH, KOH, LiOH, inter alia, and mixtures thereof This base is at least initially (during the preparation) included in the solution. It is clear that at least part of this base subsequently reacts with the other solutes in the solution.

In an advantageous provision of the invention, the boron-containing product is selected from the following list: boron oxides, boric acids, borates and mixtures thereof, the preferred compounds being as follows: $B_4O_7Na_2.10H_2O$ (borax), $B_4O_7Na_2.5H_2O$ (borax pentahydrate), $B_4O_7Na_2$ (anhydrous borax), $B(OH)_3$ (boric acid), $B_2O_3$ (boron trioxide), $B_{10}O_{16}Na_2.10H_2O$ (sodium pentaborate), $BO_2Na.4H_2O$ (sodium metaborate), $B_{10}O_{18}K_2.8H_2O$ (potassium pentaborate), $B_4O_7K_2.4H_2O$ (potassium tetraborate), $B_4O_7(NH_4^+)_2.4H_2O$ (ammonium pentaborate), inter alia, and mixtures thereof, the association of boric acid with sodium hydroxide, for conversion to sodium pentaborate, being particularly preferred.

Another characteristic but non-limiting parameter of the solution according to the invention is its density at 20° C., which is preferably 1.4±0.4.

According to another of these features, the invention relates to a boron-containing aqueous solution which can be employed in the use described above and which is characterized in that the boron-containing product consists of a mixture of at least one borate and boric acid and/or $B_2O_3$. The borates are for example those described above.

In an advantageous modified mode carried out of the invention, the solution particularly contains at least one additive selected from:

antifoams, biocides, agents for increasing moisture resistance, colorants, ionic or non-ionic surfactants and mixtures thereof.

The biocide is preferably selected from quaternary ammonium compounds and/or isothiazolinone derivatives. Formol, glutaraldehyde and aldehydes may be mentioned as other examples of biocides, particularly bactericides and/or fungicides.

Apart from antifoams, the solution can also comprise other surfactants such as ethoxylated fatty acids, block copolymers with a hydrotope of the cumenesulfonate or xylenesulfonate type, or ionic or non-ionic surfactants of the 2-ethylhexyl sulfate or ethoxylated fatty alcohol type.

The solution can also contain other ingredients of the following types: ketoaldehyde resin, colorant, perfume or a solvent of the methanol type.

In practice, the boron-containing aqueous solution employed particularly in the context of the use according to the invention can have the following composition:

| | |
|---|---|
| boric acid (containing 56.3% by weight of $B_2O_3$ and 43.7% by weight of water) | 0–80% by weight |
| sodium pentaborate | 0–35% by weight |
| alkali metal borate(s) | 0–20% by weight |
| $B_2O_3$ | 0–50% by weight |
| NaOH (30% by weight) | 0–50% by weight |
| hydroxylamine, amine, hydrazine | 0–40% by weight |
| organic polyhydroxylic compound | 0–50% by weight |
| antifoam and/or biocide and/or surfactant (inter alia) | 0–20% by weight |

In general terms, the preparation of the solution employed particularly in the above-mentioned use consists in solubilizing the above-defined solutes in water at a temperature preferably of between 20° C. and 55° C.

The amiohydroxylated and/or alkylamiine and/or polyhydroxylated compound and, if appropriate, the strong base are advantageously initially mixed with water, the boron-containing product or products then being incorporated and mixed in.

More precisely, at least part of the water constituting the solution is preheated (for example to 40° C.) and at least part of the amino and/or polyhydroxylated compounds is incorporated, with stirring, until a homogeneous mixture is obtained.

The boron-containing product or products are then added to the medium, with stirring. In the case where the boron-containing products consist of a mixture of borate and boric acid, the borate is advantageously introduced first.

The ingredients are mixed and an exothermic neutralization reaction then takes place.

Homogenization is then continued by mixing the medium for several minutes, for example for one hour, while keeping the temperature at values of between 45 and 50° C., e.g. for a $B_2O_3$ concentration of about 40% by weight. This gives a clear solution in which all the solutes introduced are solubilized.

The final step is to allow the solution to cool, preferably with continued stirring in order to avoid the formation of 'orange peel'.

The other ingredients, such as the biocide and/or the antifoam (inter alia), can be incorporated at any time, but they are preferably incorporated after cooling, with continued stirring of course.

INDUSTRIAL APPLICATION

The present invention further relates to the starch paste to which the solution employed in the above-described use has been added.

Finally, the invention further relates, inter alia, to the use of the above-defined solution:

for the decontamination of radioactive products, in brightening and waxing products or in biocidal compositions.

The invention will be understood more clearly with the aid of the following non-limiting Examples which illustrate the preparation of the boron-containing liquid adjuvant according to the invention and its use for the manufacture of starch pastes. These Examples also show the physicochemical characteristics of the clear boron-containing adjuvant and the starch paste, particularly as regards specifications relevant to the application. These Examples clearly show all the advantages of the invention as well as some of the modified modes which can be envisaged for carrying out the invention.

EXAMPLES

Example I

PREPARATION OF BORON-CONTAINING AQUEOUS SOLUTIONS

I.1. Starting Materials Used (i) The boron-containing products used are those marketed by BORAX and those originating from Turkey.

| Borax: $B_4O_7Na_2.10H_2O$ of the following theoretical composition: | |
|---|---|
| Boron trioxide ($B_2O_3$) | 36.52% |
| Sodium oxide, $Na_2O$ | 16.25% |
| Water of crystallization | 47.23% |
| Neobor or borax pentahydrate = $B_4O_7Na_2.5H_2O$ Theoretical composition: | |
| $B_2O_3$ | 47.80% |
| Oxide, $Na_2O$ | 21.28% |

| -continued | |
|---|---|
| Water of crystallization | 30.92% |
| Boric acid = $B(OH)_3$, theoretical $B_2O_3$ composition | 56.3% |
| Water | 43.7% |
| Boron trioxide, $B_2O_3$, or Glacibor containing 31.1% by weight of boron Sodium pentaborate, $B_{10}O_{16}Na_2.10H_2O$ Theoretical composition: | |
| $B_2O_3$ | 58.98% |
| $Na_2O$ | 10.50% |
| Water of crystallization | 30.52% |

(ii) The aminohydroxylated products used are monoethanolamine, diethanolarine and triethanolamine. The polyhydroxylated product used is glycerol. The amino product employed is diethylenetriamine.

I.2 Methodology step a)

In one modified embodiment of the process of the present invention, a strong base of the sodium hydroxide type is reacted, with stirring, with boric acid in water preheated to 50° C. in order to form an aqueous solution of sodium pentaborate.

The reaction can be represented by the following equation:

$$2\ NaOH + 10\ H_3BO_3 \rightarrow (B_{10}O_{16}Na_2.10\ H_2O) + 6\ H_2O$$

This step can be carried out with a weight ratio of sodium hydroxide to boric acid which generally ranges from 2.0 to 2.4. It is preferable to use stoichiometric amounts of both the reactants so that the reaction leads to the formation of the maximum possible amount of sodium pentaborate. The sodium hydroxide can be totally or partially replaced with at least one sodium borate to form an aqueous solution of sodium pentaborate.

The amino compound is then incorporated, giving rise to an exothermic dilution reaction.

step b)

The boric acid is then incorporated, giving rise to an exothermic neutralization reaction between the boric acid and the amine.

In the case where a borate+boric acid mixture is used, the borate is introduced first.

The ingredients are mixed until the mixture is completely homogeneous and liquid.

The reaction temperature can generally range up to 95° C., but in practice it is between 40 and 50° C. in the preferred embodiment.

The clear solution obtained is then allowed to cool, with continued stirring, until it has returned to room temperature, i.e. between 20 and 30° C.

step c)

One or more additives of the following types can be added to this clear solution: biocide and/or antifoams and/or anionic and/or non-ionic surfactant, etc., and mixtures thereof.

Table I below gives the compositions of the various test products prepared.

TABLE I

| Constituents of the boron-containing aqueous solution in % by weight Experiments | theoretical $B_2O_3$ | water | boric acid | sodium pentaborate | Borax | $B_2O_3$ | NeoBor | Mono-ethanol-amine | Dietha-nolamine | diethylene-triamine | sodium hydroxide 30% by weight | glyc-erol | pH |
|---|---|---|---|---|---|---|---|---|---|---|---|---|---|
| 1 | 34 | 25 | 35 | 25 | 0 | 0 | 0 | 15 | 0 | 0 | 0 | 0 | 7.7 |
| 2 | 35 | 16 | 62 | 0 | 0 | 0 | 0 | 22 | 0 | 0 | 0 | 0 | 8 |
| 3 | 34 | 19 | 60 | 0 | 0 | 0 | 0 | 16 | 0 | 0 | 5 | 0 | 7.4 |
| 4 | 35 | 18 | 56 | 0 | 10 | 0 | 0 | 16 | 0 | 0 | 0 | 0 | 7.3 |
| 5 | 35 | 20 | 57 | 0 | 0 | 0 | 7 | 16 | 0 | 0 | 0 | 0 | 7.25 |
| 6 | 43 | 28 | 0 | 0 | 0 | 43 | 0 | 20 | 0 | 0 | 9 | 0 | 7.45 |
| 7 | 40.5 | 0 | 72 | 0 | 0 | 0 | 0 | 20 | 0 | 0 | 8 | 0 | 7.50 |
| 8 | 35.5 | 18 | 57 | 0 | 9 | 0 | 0 | 16 | 0 | 0 | 0 | 0 | 7.17 |
| 9 | 34.4 | 17.6 | 55.3 | 0 | 9.2 | 34.4 | 0 | 15 | 0 | 0 | 2.9 | 0 | 7.20 |
| 10 | 35.8 | 20 | 57 | 0 | 0 | 0 | 0 | 16 | 0 | 0 | 0 | 0 | 7.25 |
| 11 | 34.7 | 4 | 62 | 0 | 0 | 0 | 0 | 0 | 34 | 0 | 0 | 0 | 7.25 |
| 12 | 34.9 | 25 | 62 | 0 | 0 | 0 | 0 | 0 | 0 | 13 | 0 | 0 | 7.06 |
| 13 | 35 | 41.5 | 0 | 0 | 0 | 35 | 0 | 15.5 | 0 | 0 | 8 | 0 | 7.60 |
| 14 | 41.3 | 11.5 | 42 | 30 | 0 | 0 | 0 | 16.5 | 0 | 0 | 0 | 0 | 7.18 |
| 15 | 16.9 | 0 | 30 | 0 | 0 | 0 | 0 | 0 | 0 | 0 | 30 | 40 | 7.15 |
| 16 | 34.4 | 0 | 61.2 | 0 | 0 | 0 | 0 | 15.3 | 0 | 0 | 8.1 | 0 | 7.5 |

The solutions obtained in experiments 1 to 16 are all perfectly clear.

No crystallization is observed after storage for several days at temperatures varying from −5° C. to +60° C. These boron-containing aqueous solutions are therefore remarkably stable on storage.

Example II

CHARACTERIZATION OF THE SOLUTIONS OF EXPERIMENTS 1 TO 16 AND ADDITION OF SAID SOLUTIONS TO STARCH PASTE

| II. 1 General protocol for the preparation of starch paste Steinhall DF formulation Primary | |
|---|---|
| Water (1 > 35° C.) | 600 g |
| Nopco 8034E antifoam | 1.5 g |
| Crosslinked wheat starch (H = 13.2%) (primary) | 50.8 g |
| Sodium hydroxide | 6 g made up to 30 g |
| →Stirring 20 min-speed: 2200 rpm in a deflocculating turbine (Ø = 8 cm with 2 × 8 teeth). Secondary | |
| Water (t = 20° C.) | 600 g |
| Crosslinked wheat starch (secondary) | 300 g |
| Borax-containing product | X g |
| Water | Y g |

(X + Y = 24 g)
→Stirring 15 min-speed: 2200 rpm
Lory viscosity = 25–26 sec

II. 2 Addition of test products 9 to starch paste

The refractometer percentage of test product 9 is equal to 51.6%
*Steinhall DF formulation (idem II. 1):
X: 4 g
Y: 20 g II. 2.1 After addition of the test product, the following observations are made:

*an immediate increase in viscosity,
*and the appearance of a VORTEX 60 seconds after the addition of test product 9, which is not the case for powdered boron-containing products (gelling of the paste on the starch/borate surface).
a) Viscosity measurements
a.1 LORY viscosity $\eta_L$

| Stirring time after addition of test product 9 to the paste (min) | $\eta_L$ (s) |
|---|---|
| 10 | 79 |
| 15 | 48 | a.2 Brookfield viscosity $\eta_B$

| Stirrer speed (rpm) | $\eta_B$ (m.Pa · s) |
|---|---|
| 5 | 2100 |
| 10 | 1575 |
| 20 | 1225 |
| 50 | 890 |
| 100 | 685 |

II. 2.2 Addition of water at the end of the preparation: successively

| Amounts of water added successively (g) | $\eta_L$ (s) |
|---|---|
| 40 | 40 |
| 40 | 30 |

II. 2.3 Characteristics of the paste
pH: 11.8
Gelatinization temperature: 52° C.
Commercial concentration: 21.6% (primary and secondary starch)
Stability in an oven at 35° C.:

| | $\eta_L$ | $\eta_B$ at 20 rpm |
|---|---|---|
| After 24 h | 30 sec | 610 mPa · S |
| After 48 h | 25 sec | 480 mPa · S |

The use of test product 9 in a Steinhall DF formulation as a weight-for-weight substitute for borax powder makes it possible to obtain a preparation with comparable characteristics. It should be noted that, for a dynamic viscosity of the same order of magnitude (Lory and Steinhall), a slightly higher Brookfield viscosity is obtained by using test product 9.

II.3. Evaluation of Other Samples (1, 2, 13, 16) of Boron-containing Liquid Adjuvants According to the Invention The preparative protocol of II.1 is used.

Table II below gives the experimental conditions and the results obtained

TABLE II

| Sample reference | Borax powder | experiment 1 | experiment 2 | experiment 13 | experiment 16 |
|---|---|---|---|---|---|
| $B_2O_3$ content in % | 36.47 | 34.45 | 34.90 | 35.00 | 34.30 |
| pH | — | 7.70 | 8.00 | 7.60 | 7.50 |
| Stability | Crystalline powder | B | B | B | B |
| Viscosity at 20 rpm | — | 260 | 840 | 120 | 150 |
| Refractometer % | — | 55.60 | 61.80 | 53.20 | 54.10 |
| X g | 4 | 4 | 4 | 4 | 4 |
| Water after addition of borax (Y g) | 20 | 20 | 20 | 20 | 20 |
| After addition of borax | | | | | |
| Lory after 10 min | — | 59 | 64 | — | 82 |
| Lory after 15 min | 37 | 44 | 45 | 43 | 49 |
| Temperature in ° C. | 33 | 33 | 34 | 34 | 33 |
| Brookfield viscosity (5-10-20-50-l00 rpm) | 1450–1130 900 680–550 | 1820–1430 1170 890–700 | 1980–1580 1250 930–740 | 1960–1350 1090 810–670 | 2010–1650 1300 950–735 |
| Addition of water at the end of the preparation | 20    37 20    32 20    30 20    26 | 20    43 20    35 20    30 20    27 | 20    38 20    32 20    27 20    — | 40    34 40    27 —    — —    — | 40    42 —    — 40    31 —    — |
| (1) Lory in sec: water added (g) → $\eta_L$ | | | | | |
| Total water added at the end of the preparation | 80 | 80 | 80 | 80 | 80 |
| Brookfield viscosity (5-10-20-50-100 rpm) (1) | 890–740 620 480–390 | 1040–840 680 510–410 | 1090–860 700 540–440 | 920–780 650 510–470 | 1300–1000 800 600–470 |
| Ratio $\eta_B$ at 5 rpm/100/$\eta_B$ at 10 rpm/100 | 2.28/1.90 | 2.54/2.05 | 2.48/1.95 | 2.19/1.86 | 2.76/2.13 |
| Ratio 20 rpm/Lory | 23.80 | 25.20 | 25.90 | 24.10 | 25.80 |
| Gelatinization temperature in ° C. | 51 | 53 | 53 | 51 | 52 |
| pH | 11.80 | 11.80 | 11.40 | 11.60 | 11.70 |
| Commercial concentration (in %) of total starch | 21.40 | 21.40 | 21.40 | 21.40 | 21.40 |
| Stability in an oven at 35° C. Lory/rpm after | | | | | |
| 24 h (2) | 29 \| 520 | 28 \| 510 | 26 \| 480 | 44 \| | 28 \| 560 |
| 48 h | — | 22 \| 370 | — | — | — |
| 3 days | — | 19 \| 310 | — | — | — |
| 4 days | — | 17 \| 270 | — | 33 \| 570 | 20 \| 320 |
| 6 days | — | — | — | — | — |
| Viscosity difference between (1) and (2) | 100 | 170 | 220 | 80 | 240 |

Comments on the Results:

The replacement of borax powder with borax-containing products in liquid form, in Steinhall formulations, results in a sharp increase in the viscosity as soon as the borax-containing product is added, and in a more rapid appearance of the vortex.

Example III

PREPARATION OF STARCH PASTES WITH A BORON-CONTAINING LIQUID ADJUVANT COMPRISING A BIOCIDE

| III.1. Preparation of the paste formulation | |
|---|---|
| Water 40° C. | 400 g |
| Primary starch | 35 g |
| 30.5% sodium hydroxide | 150 g |
| Cold water | 205 g |
| Secondary starch | 200 g |
| Liquid adjuvant of experiment 2 | 2 g |
| Biocide | Z % based on all the constituents of the paste |

The biocide is:

| | |
|---|---|
| ACTICIDE SPX marketed by THOR | (B1) |
| ACTICIDE RS marketed by THOR | (B2) |
| 30% FORMOL | (B3) |
| or ACTICIDE B 20 marketed by THOR | (B4) |

III.2 Microbiological Stability With or Without Inoculation

The inoculum used comprises:

BACTERIAL STRAINS

*Pseudomonts aeruginosa*

*Pseudomonas stutzeri*

*Pseudomonas putida*
*Pseudomonas luteus*
*Enterobacter aerogenes*
*Alcaligenesfaecalis*
*Aeromonas hydrophila*
*Cellulomonasflafigena*
*Arthrobacter nicotianae*
*Escherichia coli*
*Proteus vulgaris*
*Corynebacterium ammoniagenes*
FUNGAL STRAINS
*Aspergillus oryzae*
*Penicillium ochrochloron*
*Geotrichum candidum*
Storage of the samples at 35° C.
The results are given in Table III below.

TABLE III

|  | Presence of germ | | | | |
| --- | --- | --- | --- | --- | --- |
|  | without inoculation | | | | inoculation |
|  | 1 d | 2 d | 3 d | 5 d | 1 d |
| Negative control | 0 | 0 | ++ | +++ | ++++ |
| $B_1$ Z = 0.01% | 0 | 0 | 0 | 0 | 0 |
| $B_2$ Z = 0.02% | 0 | 0 | 0 | 0 | 0 |
| $B_3$ Z = 0.01% | 0 | 0 | 0 | 0 | 0 |
| $B_4$ Z = 0.01% | 0 | 0 | 0 | 0 | 0 |

What is claimed is:

1. A boron-containing aqueous solution which consists essentially of a mixture of (i) a boron compound selected from the group consisting of boric acid, boron trioxide, a borate and mixtures thereof, (ii) a base selected from the group consisting of sodium hydroxide, potassium hydroxide and lithium hydroxide, (iii) an amino compound and (iv) water,
   wherein the solution has
      a theoretical amount of $B_2O_3$ of between about 22 and about 55 wt %,
      a solubilized complex between the boron compound and the amino compound, and wherein the solution has a pH of between about 6 and about 9.

2. The solution of claim 1, wherein said amino compound is selected from the group consisting of an aminohydroxylated compound, an alkylamino compound, an arylamino compound and mixtures thereof.

3. The solution of claim 2, wherein the aminohydroxylated compound is selected from the group consisting of monoethanolamine, diethanolamine, triethanolamine and mixtures thereof.

4. The solution of claim 3, wherein the aminohydroxylated compound is monoethanolamine.

5. The solution of claim 1, wherein the amino compound is selected from the group consisting of hydrazine, diethylenetriamine, ethylenediamine and mixtures thereof.

6. The solution of claim 1, wherein the theoretical amount of $B_2O_3$ is between about 25 and about 45 wt %.

7. The solution of claim 6, wherein the theoretical amount of $B_2O_3$ is between about 32 and about 38 wt %.

8. The solution of claim 1, which has a pH of between about 7 and about 8.

9. The solution of claim 1, wherein the boron compound is boric acid.

10. The solution of claim 1, wherein the base is sodium hydroxide.

11. A boron-containing aqueous solution which consists essentially of a mixture of (i) a boron compound selected from the group consisting of boric acid, boron trioxide, a borate and mixtures thereof, (ii) a base selected from the group consisting of sodium hydroxide, potassium hydroxide and lithium hydroxide, (iii) an amino compound, (iv) at least one compound selected from the group consisting of a biocide, an antifoaming agent, a colorant, an anionic surfactant, a non-ionic surfactant and mixtures thereof and (v) water, wherein the solution has:
   a theoretical amount of $B_2O_3$ of between about 22 and about 55 wt %,
   a solubilized complex between the boron compound and the amino compound, and wherein the solution has a pH of between about 6 and about 9.

12. The solution of claim 11, wherein said amino compound is selected from the group consisting of an aminohydroxylated compound, an alkylamino compound, an arylamino compound and mixtures thereof.

13. The solution of claim 12, wherein the aminohydroxylated compound is selected from the group consisting of monoethanolamine, diethanolamine, triethanolamine and mixtures thereof.

14. The solution of claim 13, wherein the aminohydroxylated compound is monoethanolamine.

15. The solution of claim 11, wherein the amino compound is selected from the group consisting of hydrazine, diethylenetriamine, ethylenediamine and mixtures thereof.

16. The solution of claim 11, wherein the theoretical amount of $B_2O_3$ is between about 25 and about 45 wt %.

17. The solution of claim 16, wherein the theoretical amount of $B_2O_3$ is between about 32 and about 38 wt %.

18. The solution of claim 11, which has a pH of between about 7 and about 8.

19. The solution of claim 11, wherein the boron compound is boric acid.

20. The solution of claim 11, wherein the base is sodium hydroxide.

21. An adjuvant for starch paste, consisting of the solution of claim 1.

22. An adjuvant for starch paste, consisting of the solution of claim 11.

23. A starch paste containing the adjuvant of claim 21.

24. A starch paste containing the adjuvant of claim 22.

* * * * *